(12) United States Patent
Biskup et al.

(10) Patent No.: US 6,751,757 B2
(45) Date of Patent: Jun. 15, 2004

(54) DISK DRIVE DATA PROTECTION USING CLUSTERS CONTAINING ERROR DETECTION SECTORS

(75) Inventors: Richard J. Biskup, Sunnyvale, CA (US); Brian R. Davis, Sunnyvale, CA (US); James A. McDonald, Palo Alto, CA (US); Robert W. Horst, Saratoga, CA (US)

(73) Assignee: 3Ware, Sunnyvale, CA (US)

( * ) Notice: Subject to any disclaimer, the term of this patent is extended or adjusted under 35 U.S.C. 154(b) by 574 days.

(21) Appl. No.: 09/732,244

(22) Filed: Dec. 7, 2000

(65) Prior Publication Data

US 2002/0112204 A1 Aug. 15, 2002

(51) Int. Cl.[7] .................................................. G06F 11/08
(52) U.S. Cl. ............................. 714/54; 714/52; 714/53; 714/701; 711/112
(58) Field of Search ............................. 714/48, 52, 53, 714/54, 701, 703, 718, 719, 720, 722, 736, 766, 767, 819; 711/112

(56) References Cited

U.S. PATENT DOCUMENTS

| | | | |
|---|---|---|---|
| 5,255,270 A | | 10/1993 | Yanai et al. |
| 5,274,645 A | * | 12/1993 | Idleman et al. ................ 714/6 |
| 5,329,622 A | | 7/1994 | Belsan et al. |
| 5,379,417 A | | 1/1995 | Lui et al. |
| 5,412,666 A | | 5/1995 | Squires et al. |
| 5,517,484 A | | 5/1996 | Takagi et al. |
| 5,640,286 A | | 6/1997 | Acosta et al. |
| 5,696,775 A | | 12/1997 | Nemazie et al. |
| 5,699,509 A | * | 12/1997 | Gary et al. .................... 714/54 |
| 5,805,799 A | * | 9/1998 | Fredrickson et al. .......... 714/52 |
| 5,813,025 A | | 9/1998 | Murphy et al. |
| 5,903,532 A | | 5/1999 | Ikeda |
| 5,951,693 A | | 9/1999 | Walton et al. |
| 5,953,265 A | | 9/1999 | Walton et al. |
| 6,034,897 A | * | 3/2000 | Estakhri et al. ........ 365/185.33 |
| 6,067,635 A | | 5/2000 | DeKoning et al. |
| 6,098,114 A | | 8/2000 | McDonald et al. |
| 6,195,761 B1 | | 2/2001 | Kedem |
| 6,233,696 B1 | | 5/2001 | Kedem |
| 6,301,644 B1 | * | 10/2001 | Andoh et al. ................ 711/201 |

FOREIGN PATENT DOCUMENTS

EP     0 466 296 A2     1/1992

OTHER PUBLICATIONS

Doyle, Casey D., Computer Dictionary, 1993, Microsoft Press, Second Edition, p. 182.*
Algirdas Avižienis, et al., *The Evolution of Fault-Tolerant Computing* (New York, Springer-Verlag / Wien, 1987). pp, 55–76.
Daniel P. Siewiorek, et al., *Reliable Computer Systems* (Burlington, Digital Equipment Corporation, 2nd ed. 1992), pp. 648–670.
International Search Report from International Application No. PCT/US 01/47937 with mailing date Jan. 5, 2004.

* cited by examiner

*Primary Examiner*—Robert Beausoliel
*Assistant Examiner*—Joseph D Manoskey
(74) *Attorney, Agent, or Firm*—Knobbe, Martens, Olson & Bear LLP

(57) ABSTRACT

The present invention is related to methods and apparatus that can enhance the reliability of a hard drive by providing a built-in error check in the drive. Conventional hard drives can erroneously seek to an incorrect location on a platter of the hard drive. The erroneous seek corrupts the data stream and is difficult to detect and correct. Embodiments of the present invention can detect a logical block address assigned to a portion of the platter of the hard drive and thereby detect when an erroneous seek has occurred. Upon detection of an error, one embodiment of the present invention can further take corrective action to read from the correct portion of the platter.

42 Claims, 10 Drawing Sheets

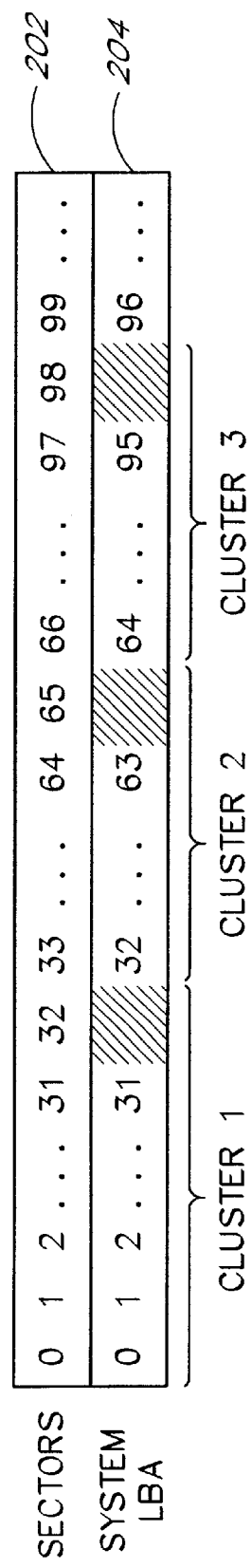

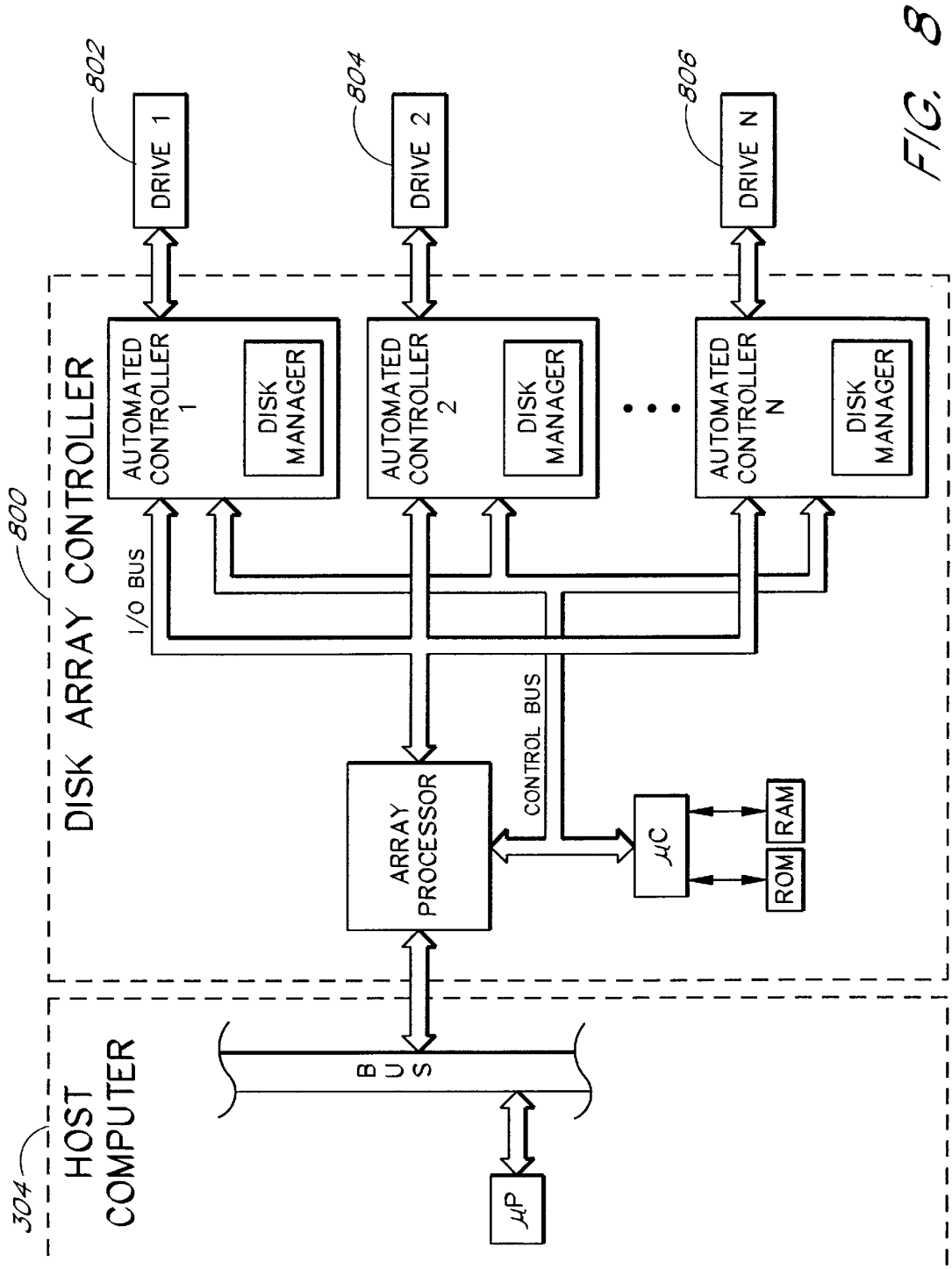

DISK DRIVE DATA PROTECTION USING CLUSTERS CONTAINING ERROR DETECTION SECTORS

BACKGROUND OF THE INVENTION

1. Field of the Invention

The present invention generally relates to mass storage as used in computer systems. In particular, the present invention relates to verifying the integrity of data from a storage device in a computer system.

2. Description of the Related Art

Computer systems frequently store voluminous quantities of data on mass storage devices. A hard drive or a disk drive is one form of mass storage. Popular interface formats that are used for hard drives include the various versions of the small computer system interface (SCSI) and the AT attachment (ATA) interface standards.

Those in the art have sought to use low cost drives, such as ATA drives, in relatively high reliability applications to save cost. However, an end user of an off-the-shelf hard drive often has no convenient or timely way of identifying whether the drive selected is reliable or unreliable.

A disk drive typically includes an internal firmware driven controller, which can be prone to firmware bugs. One example of a firmware bug that results in corrupt data is a firmware bug in code that is responsible for caching hard disk data to a memory buffer. In addition, a drive can occasionally seek to an incorrect location on a hard disk platter. For example, when a host computer or controller requests data from logical block address A, the drive can unexpectedly return data from logical block address B instead of logical block address A.

In a conventional drive, the erroneous seek occurs without warning or indication and the host system is unaware that the drive has erroneously provided data from a wrong location. Although error checking protocols exist, the error checking in a conventional drive is limited to the verification of data transmitted from the drive to a host on an interconnect system, e.g., error checking within an ATA interface. Where the data in the drive is already corrupted by, for example, seeking to the wrong physical location, conventional error checking schemes may fail to detect the error.

One conventional approach to improve the reliability of a drive embeds error checking information in non-standard size sector. For example, one conventional approach uses special hard drives that store error checking information in two or more bytes of the non-standard size sector. A standard sector contains 512 bytes. By contrast, the special hard drives store error checking information in the extra two or more bytes of the larger than standard size sectors. A disadvantage to the special drives is a loss in economies of scale, as the special drives differ from standard off-the-shelf drives and are produced in much smaller quantities.

SUMMARY OF THE INVENTION

Embodiments of the present invention overcome the disadvantages of current systems by providing techniques that allow ordinary disk drives to verify that a seek to a track has been properly commanded by verifying that the desired sector has been accessed. The techniques can apply to single disk drives or to multiple disk drive systems such as in a redundant array of inexpensive disks (RAID). One embodiment maintains a reference to the logical block address of a cluster in an extra sector of the cluster, which allows the embodiment to verify that the seek had been properly executed.

Other embodiments according to the present invention advantageously maintain an error detection code, such as a Cyclic Redundancy Check (CRC) checksum, in an extra sector of the cluster that can be used to verify the integrity of the remainder of the data in the cluster. In yet another embodiment, both the reference to the logical block address and the error detection code are stored in the extra sector.

One embodiment of the present invention groups sectors in the disk drive into clusters of sectors. The cluster referenced herein is different than the cluster used in a file allocation table (FAT). The cluster of sectors according to an embodiment of the present invention includes multiple input/output data sectors and at least one "extra" sector. The extra sector maintains error checking information that can be used to verify the data in the data sectors, to verify that a read/write head has performed a seek to the correct track, and the like. The error checking information is recalculated upon extraction of the data from the cluster and compared with the previously stored calculation. In one example, a reference to a logical block address of a sector in the cluster is stored in the extra sector. In another example, the data verification portion of the error checking information conforms to a CRC-CCITT polynomial. The extra sectors occupy a portion of the storage space of the disk drive and the logical block addresses used by a host computer system are translated to new logical block addresses used by the disk drive. A number of sectors requested for transfer can also be translated to compensate for the sectors occupied by the extra sectors.

According to one embodiment of the present invention, to perform a write operation to the disk drive, the old data from the data group of the cluster disk drive is first read, then modified with the new data, and then written to the disk drive. The read-modify-write process allows a computation of the error checking information to be performed quickly and efficiently. A memory buffer can also be used to temporarily store the data to be written to the disk drive.

In another embodiment of the present invention, an indicator of a location of a cluster of sectors is stored in an extra sector of the disk drive. In one embodiment, the indicator corresponds to the logical block address (LBA) of the first data sector of the cluster of sectors. By maintaining a reference to the physical location of the accessed sector, the embodiment can detect whether the correct sector has been accessed. If an erroneous seek occurred, another seek can be commanded to the hard drive, by, for example, setting an interrupt to a firmware controller. In one embodiment, the other seek can include a command to move the read/write head to other tracks, a command to flush a memory cache, and the like.

BRIEF DESCRIPTION OF THE DRAWINGS

These and other features of the invention will now be described with reference to the drawings summarized below. These drawings and the associated description are provided to illustrate preferred embodiments of the invention, and not to limit the scope of the invention.

FIG. 1 illustrates a typical sector format.

FIG. 2 illustrates a sector format according to one embodiment of the present invention.

FIG. 8 illustrates an embodiment of the present invention incorporated into a controller for a redundant array of inexpensive disks (RAID).

GLOSSARY OF TERMS

Figure 3:
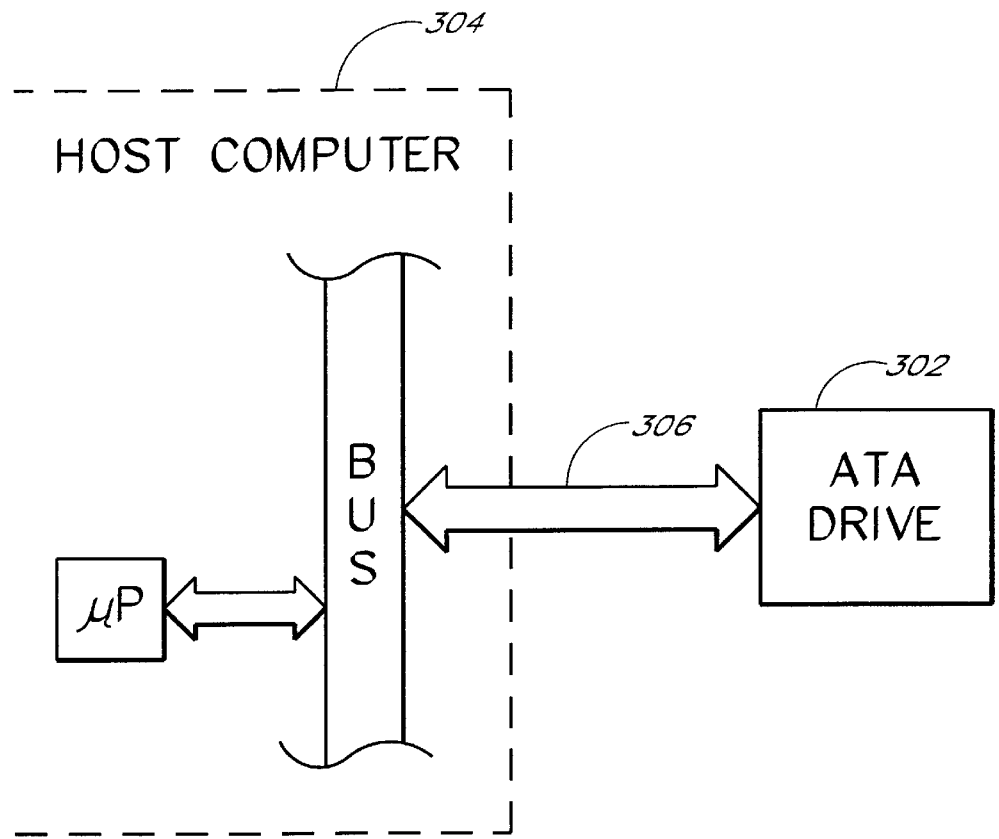
FIG. 3 illustrates a conventional hard drive interconnected with a host computer system.

Sector
The smallest unit of data that can be accessed in a hard disk. In a conventional drive, a sector holds 512 bytes of data. Some systems do not address an individual sector; rather, the system relates files to clusters.

Cluster
A group or arrangement of sectors.

Checksum
A generic term that refers to a calculation that can be used to verify the integrity of data. Traditionally, a checksum was a simple summation, but the term now encompasses more sophisticated algorithms such as the Cyclic Redundancy Check (CRC).

CRC
A checksum based on a polynomial division of data.

DETAILED DESCRIPTION OF PREFERRED EMBODIMENTS

Although this invention will be described in terms of certain preferred embodiments, other embodiments that are apparent to those of ordinary skill in the art, including embodiments which do not provide all of the benefits and features set forth herein, are also within the scope of this invention. Accordingly, the scope of the present invention is defined only by reference to the appended claims.

A disk drive subsystem according to an embodiment of the present invention can advantageously detect when a disk drive has returned erroneous information by seeking to a wrong sector. In one embodiment, the subsystem organizes the hard disk into 33-sector clusters and stores a logical block address (LBA) of the first sector in the cluster and a Cyclic Redundancy Check (CRC) checksum of the first 32 sectors of the cluster in the $33^{rd}$ sector of the cluster. In response to a read request from a host computer system, the subsystem verifies that a seek to the desired track occurred by reading and comparing the LBA stored in the $33^{rd}$ sector to an expected LBA. The subsystem can perform subsequent measures to attempt to retrieve the correct information and can further provide a warning to a host computer. Advantageously, the subsystem is compatible with existing standard off the shelf disk drives, although in some embodiments, the subsystem can also be incorporated into the disk drive itself.

A typical disk drive, such as a hard drive, stores data on a platter that is spun at a relatively high rpm by a spindle. In some hard drives, multiple platters are used to increase the capacity of the hard drive. The hard drive stores data on the platter by encoding the data and writing magnetic flux transitions or magnetic flux reversals on the surface of the platter with a head. To retrieve the stored data, the head reads the magnetic flux transitions and the hard drive decodes the transitions to data. Of course, the head can include multiple read and multiple write heads. A servo moves the head to align the head to a track. Control logic, which can include an embedded microcontroller, controls the positioning of the head by the servo. The positioning of the head over a track is one operation that is performed during a seek to data.

The platter is typically arranged into numerous tracks (or cylinders for multiple platter drives) that can be written to and read by the head. For example, a typical platter has in the tens of thousands of tracks. A typical track contains thousands of sectors, each of which, in a standard hard drive, contains 512 bytes of data. In a hard drive using zone bit recording (ZBR), the tracks of the platter are further grouped into zones such that an outer track, with greater circumference than an inner track, contains more sectors than the inner track.

In some hard drives, a sector is specified by its track and sector number. A sector can also be specified by a logical track and sector number. In many conventional hard drives, each sector of the hard drive is assigned a logical block address (LBA). A host system requests data from the hard drive by specifying an LBA or a set of LBAs, and an embedded microcontroller translates the LBA received from the host to the physical address of the sector on the platter. When the embedded microcontroller erroneously commands a read from a sector that does not correspond to the LBA, the hard drive returns erroneous information.

FIG. 1 illustrates a typical sector format. A top row 102 indicates the sectors and a bottom row 104 indicates the corresponding LBAs of the sectors above. In a typical disk drive, each sector corresponds to an LBA as shown in FIG. 1. For example, the millionth sector can correspond to the millionth LBA address. In the typical sector format shown in FIG. 1, N corresponds to the highest valid LBA for data. The highest valid LBA is typically determined by the number of valid sectors in the disk drive, and the number of valid sectors in the disk drive is typically less than the highest possible address that could be addressed by the number of address bits that carry the LBA. In one embodiment, the LBA is defined by 64 bits to allow a relatively large number of sectors to be addressed.

FIG. 2 illustrates a sector format according to one embodiment of the present invention. A top row 202 again indicates the sectors and a bottom row 204 indicates the corresponding LBAs of the sectors as seen from a system external to the embodiment. In the illustrated embodiment, the sectors are grouped into 33-sector clusters. The first 32 sectors of the cluster store input/output (I/O) data, and the $33^{rd}$ sector of the cluster stores error checking information, such as cyclic redundancy check checksums and LBAs. In the illustrated embodiment, the LBAs for the system are mapped such that the use of every $33^{rd}$ sector to store error checking information is transparent to the external system.

FIG. 3 illustrates a conventional hard drive 302 interconnected with a host computer system 304 by a cable or other interconnect 306. In the example shown, the hard drive 302 and the interconnect 306 conform to an ATA drive specification. The host computer system 304 writes data to and reads data from the hard drive 302 via the interconnect 306. The interconnect 306 carries an address, such as an LBA from the host computer system, which indicates where the hard drive should read or write. The interconnect further carries data corresponding to the address.

Many operating systems that can execute on the host computer system 304 do not individually access or address each sector of the hard drive. Rather, the operating system groups sectors into clusters so that the operating system does not have to keep track of individual sectors. The grouping into clusters allows the operating system to maintain a relatively small reference table to track the location of a file. The file allocation table (FAT) techniques, as used in the Windows® operating systems from Microsoft Corporation, are examples of techniques that relate files to clusters, and thereby sectors, on the hard disk. For example, the FAT techniques known as FAT16 and FAT32 reference clusters in 16-bit and 28-bit tables, respectively. Typically, from 4 to 64, and from 8 to 64 sectors are grouped into clusters, respectively, for the FAT techniques known as FAT16 and FAT32. Attention is drawn to the fact that the term "cluster" applies generically to a group of sectors and is used herein to designate a group of sectors as defined within a FAT of computer system 304 as well as a group of sectors that is used by a subsystem or disk manager according to an embodiment of the present invention.

Figure 4:
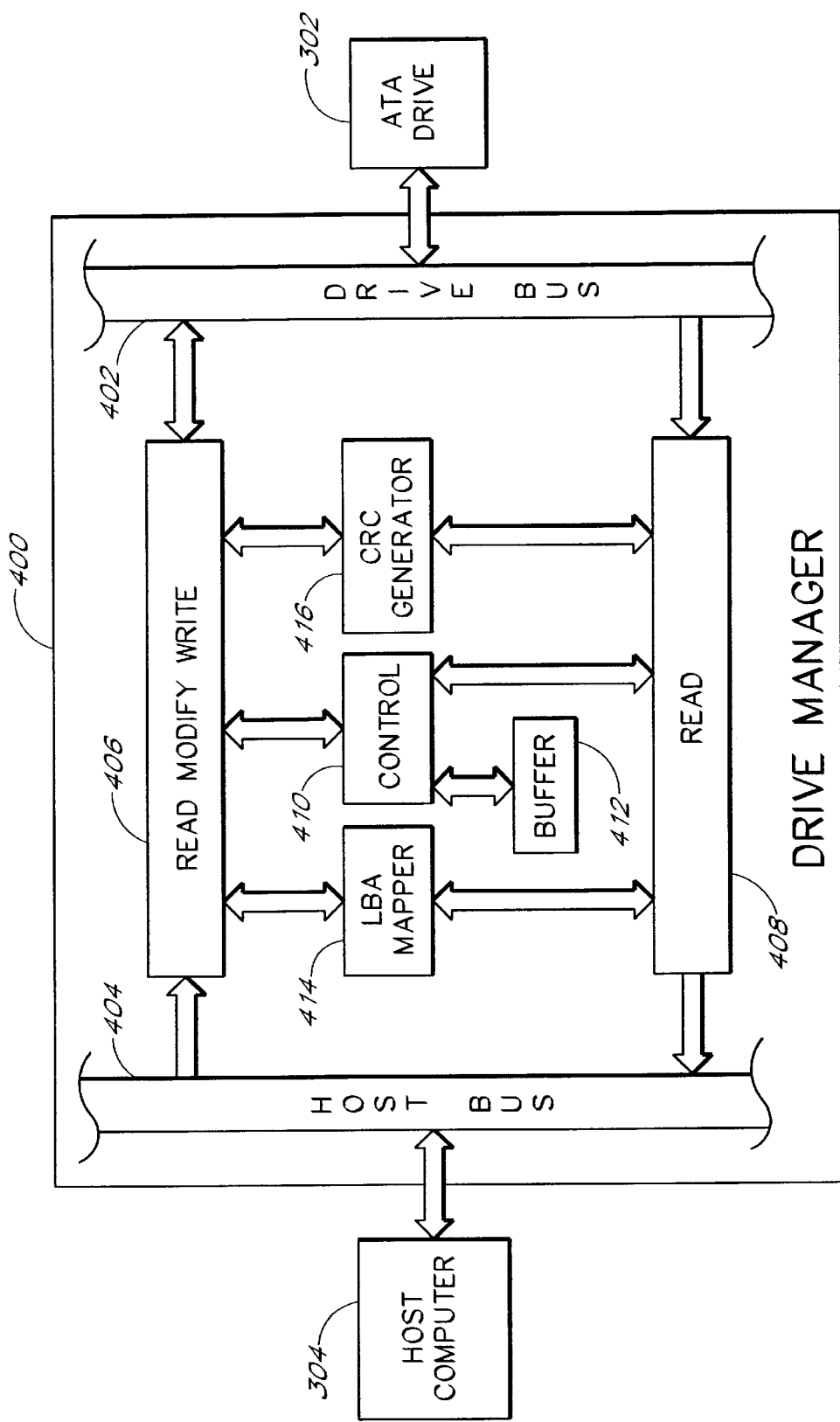
FIG. 4 illustrates an auxiliary disk controller according to an embodiment of the present invention.

FIG. 4 illustrates a drive manager 400 according to one embodiment of the present invention. The drive manager communicates with the drive 302 and with the host 304 through a drive bus 402 and a host bus 404, respectively. It will be understood by one of ordinary skill in the art that the drive 302 can be a drive from any number of drive types, such as ATA, SCSI, etc. The drive manager 400 includes a read modify write circuit 406, a read circuit 408, a control circuit 410, a buffer 412, an LBA mapper 414, and optionally includes a CRC generator 416. The drive manager 400 may, for example, be embodied within an application specific integrated circuit (ASIC) of a disk array controller system.

In response to a write request from the host computer 304 to the drive 302, the read modify write circuit 406 accepts data from the host computer 304 and writes the data, together with additional data that enhances the security of the host computer data, to the drive 302. In one embodiment, the read modify write circuit 406 first reads the existing data on the corresponding sectors, modifies the data with the data received from the host computer 304, and writes the data to the drive 302. The buffer 412 can temporarily store data received from the host computer 304 until the data is written to the drive 302. The LBA mapper 414 converts an LBA from the host computer 304 to an LBA that is used by the drive 302. Further details of the LBA mapping performed by the LBA mapper 414 are described later in connection with FIG. 5. The optional CRC generator 416 calculates a checksum-like computation of the data written to the drive 302 so that the integrity of the stored data can be verified at a later time. The CRC that is calculated and stored on the disk is in addition to a CRC calculation that may be computed by a hard disk when the hard disk is transmitting data across an interface. Further details of the CRC generator 416 are described later in connection with FIG. 7.

In response to a read request from the host computer 304 to the drive 302, the read circuit 408 accepts data from the drive 302 and verifies that the LBA associated with the read request corresponds to the LBA associated with the read data. It will be understood by one of ordinary skill in the art that the LBA stored on the drive 302 can be either the LBA that is referenced by the host system 304, or the LBA used by the drive. If the respective LBAs do not match, the drive manager 400 can initiate a number of tasks in response, such as set an error flag, interrupt a host processor, and the like, and can further retry reading the data from the drive 302 by commanding another read. Further details of reading data from the drive 302 are described in connection with FIG. 6.

Embodiments of the present invention can advantageously detect a variety of errors that can be made by a disk drive. Examples of sources of error include where data is incorrectly written to a disk, where data is written to an incorrect location on a disk, where data is incorrectly read from a disk, where data is read from an incorrect location on a disk, and an error in the error detection/correction circuitry, such as a stuck bit in a data line.

Figure 5:
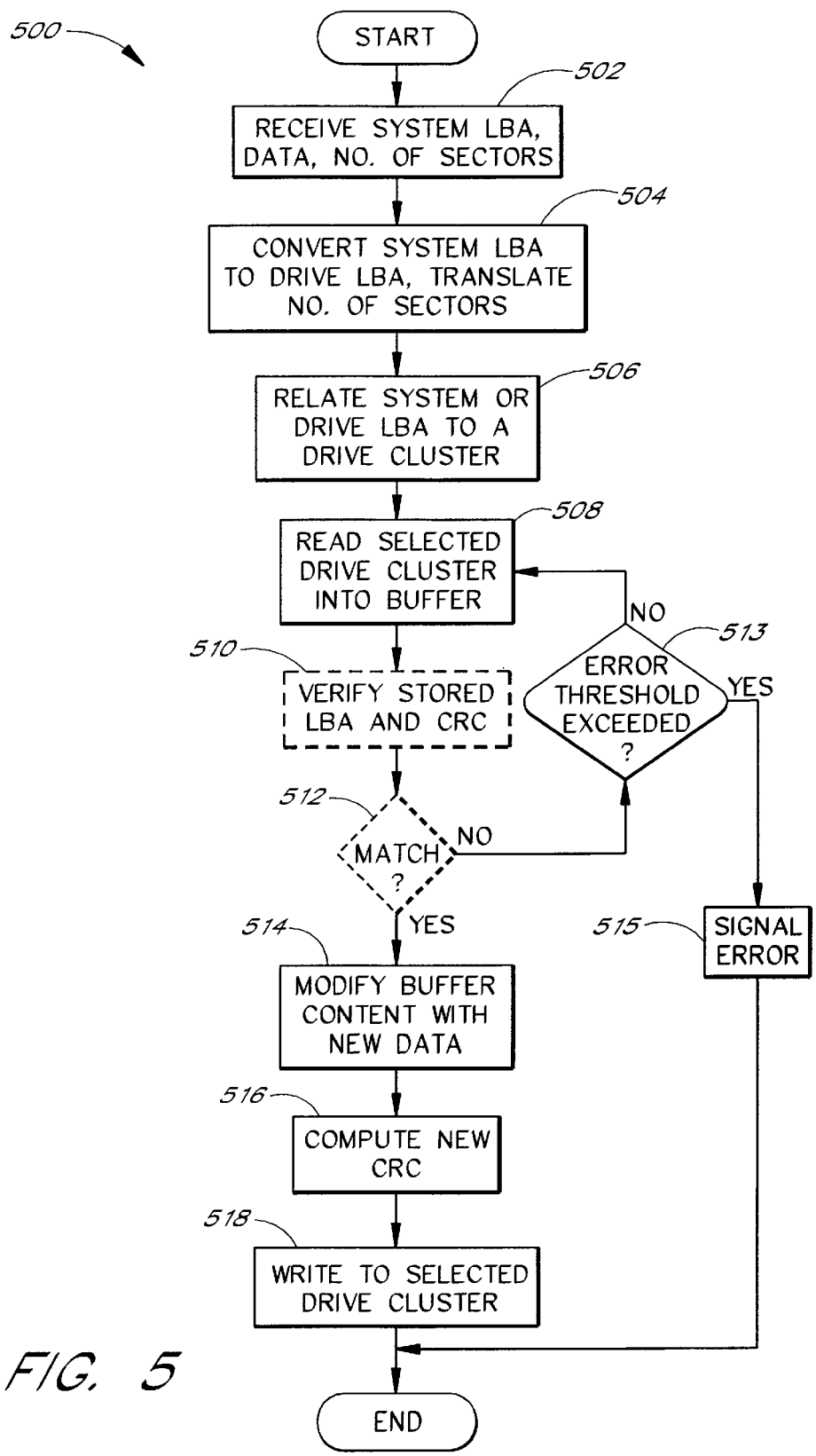
FIG. 5 is a flowchart of a process, according to an embodiment of the present invention, of writing to a hard drive.

FIG. 5 is a flowchart of an overall process 500, according to an embodiment of the present invention, which can be executed by the drive manager 400 to write to a hard drive. In State 502, the host computer sends a stream of data to be written to the hard drive. To the host computer, the addition of the drive manager 400 is transparent, i.e., no special accommodations need to be made. Typically, the host computer sends an indication of an LBA from which to start writing data, sends an indication of the number of sectors that the data occupies, and sends the data itself The process advances from State 502 to State 504.

In State 504, the drive manager 400 translates an LBA used by the system, referred to as a system LBA herein, to an LBA used by the drive, referred to as a drive LBA herein. In State 504, the drive manager 400 also translates the number of sectors to be accessed and written to from a number of sectors from the system point of view and from the drive's point of view.

In accordance with one embodiment of the present invention, the sectors of the hard drive are grouped or arranged into clusters by the drive manager 400. The cluster referenced herein is not to be confused by the cluster used by a host computer in a FAT. The sectors in the cluster are further grouped into a data group and an error checking group. The data group maintains the data that is normally stored in the drive. The error checking group maintains data that can be used to verify that the data read from the drive came from the correct location on the drive or that the data read from the drive matches with a stored CRC. In one embodiment, the error checking group is one extra sector per cluster.

In one example, the data group comprises 32 sectors and the error checking group comprises 1 sector. One sector typically contains 512 bytes and is thereby large enough to contain multiple error checking and verifying data. Although the error checking group can include more than one sector, one sector is preferred to reduce the overhead disk space used to store the verification information. The sectors that comprise the error checking group store verification information, such as logical block address and cyclic redundancy checks, and as a result, the error checking group sectors are no longer available to store normal I/O data, which in turn reduces the effective capacity of the drive. A firmware computation can translate the standard capacity of the drive to the effective capacity such that the host receives an indication of the storage capacity of the drive available to the host. It will be understood by one of ordinary skill in the art that the effective capacity can be further reduced by the reservation of other sectors in the disk drive for other purposes, such as to store configuration data of the drive manager.

It will be understood by one of ordinary skill in the art that the number of sectors that are clustered into groups by the drive manager 400 is a matter of design choice, and that there are tradeoffs associated with the selection of cluster size. For example, there could be 6 sectors in the cluster or there could be 500 sectors in the cluster. For a relatively low number of sectors per cluster, the proportional amount of space on the drive dedicated to store error checking attributes increases and as a result, a larger percentage of the volume of the hard drive is no longer available to store data.

On the other hand, where there are a relatively large number of sectors per cluster, the proportional amount of space on the drive that is no longer available to store I/O data decreases, but more time is consumed to complete a read modify write cycle. The accessing of the cluster of sectors, even where only one sector from the cluster is updated, takes longer as the size of the cluster increases because relatively more sectors are read and written. For example, where the drive manager 400 computes a CRC checksum of the data in a relatively large data group and stores the CRC checksum in an extra sector, a write to a portion of the data group results in a reading of the relatively large data group, a substitution of updated data to the relatively large data group, a recalculation of the CRC checksum, and a writing of the relatively large data group to the disk drive.

The conversion of a number of sectors and an LBA from the host computer to the drive are expressed below:

$$SN(\text{drive}) = SN(\text{host}) + \frac{SN(\text{host})}{D}$$

$$LBA(\text{drive}) = LBA(\text{host}) + \frac{LBA(\text{host})}{D}$$

In the formulas expressed above, SN(drive) relates to the number of sectors to be transferred for the drive, and SN(host) relates to the number of sectors to be transferred for the host computer. Similarly, LBA(drive) relates to the logical block address of a sector in the drive (also referred to as a physical LBA), and LBA(host) relates to the logical block address requested by the host computer. D relates to the number of data sectors in a cluster. Additionally, the result of the division is simply truncated and not rounded.

It will be understood by one of ordinary skill in the art that implementation of a division in hardware can require complex circuitry. Thus, the number of sectors in a data group of a cluster, denoted by D above, preferably conforms to a power of 2, e.g., 8, 16, 32, 64, and so on. By conforming to a power of 2, a division by the number of sectors in a data group, D, can be implemented by a simple shift to the right. Preferably, the number of sectors in a data group of a cluster, D, ranges from about 16 sectors to 64 sectors. More preferably, the number of sectors in a data group, D, includes 16, 32, or 64.

Typically, the number of sectors, SN(host), that can be requested for transfer is limited to an 8-bit field (one to 255 sectors). In one embodiment, the number of sectors in the data group, D, is 32, and the number of sectors, SN(host), is further constrained to a multiple of 32, e.g., 32, 64, 96, 128, 160, and so on. SN(host) can thereby be represented by the three most significant bits of the 8-bit field, such as, xyz0 0000(b). The division of SN(host) by D, which in the illustrated embodiment is 32, can be easily accomplished by shifting to the right 5 bits, which is then easily added back to SN(host). The illustrated addition does not actually require the use of an adder circuit because the constraint of D, the number of sectors in a data group, conforming to a multiple of 32 in the illustrated embodiment clears the least significant bits of SN(host). The result of the operation is SN(drive)=xyz0 0xyz(b).

Typically, an LBA for an ATA drive is specified as a 28-bit address. In one embodiment, 64 bits are reserved for the LBA. Any bits that are unused can be set to zero. In the illustrated embodiment, the LBA(drive) is computed by shifting LBA(host) 5 bits to the right, and adding the result back to LBA(host) in an adder. The "extra" sector, which is a 33$^{rd}$ sector in the illustrated embodiment, stores the LBA and the CRC of the preceding 32 sectors. In one embodiment, one LBA is stored in the extra sector and the LBA corresponds to the "physical" LBA of the first sector in the cluster. In addition, the LBA stored in the extra sector can be that of any sector in the cluster, or a value derived from the appropriate LBA, rather than the LBA itself. Of course, the "extra" sector can be the first sector in the cluster, rather than the last sector, or any other sector in the cluster.

It will be understood by one of ordinary skill in the art that the careful selection of the number of data sectors in a cluster and the careful selection of constraints on the number of sectors to transfer can greatly simply computation. However, it will also be understood by one of ordinary skill in the art that although the use of the numbers that are a power of 2, a multiple of 32, etc., can simplify circuit and/or firmware design, other numbers can be used as well.

The process advances from State 504 to State 506. In State 506, the drive manager 400 relates a sector to which the host system directs a write operation to a sector and a cluster on the drive. The process advances from State 506 to State 508.

In State 508, the drive manager 400 reads from the selected cluster before completing the write of data to the drive. Preferably, the contents of the selected cluster are read into a buffer. The process optionally advances from State 508 to optional States 510 and 512. In State 510, the drive manager 400 verifies that the stored LBA in the extra sector of the cluster matches with the LBA that is requested (including translation of LBAs as necessary). In one embodiment, only the LBA of the first sector of a cluster is stored in the extra sector, but it will be understood by one of ordinary skill in the art that the LBA of any sector of the cluster, or another value related to the LBA of a sector in the cluster can be stored and read such that the cluster can be identified. In another embodiment, an identifier for the cluster is stored.

In State 510, the drive manager 400 can also recalculate the error detection code such as the CRC of the stored data and compare the recalculated CRC to the CRC stored in the extra sector. In response to a detected error in the LBA or the CRC, the drive manager 400 can flag an error, set an interrupt, and the like, and can return to State 508 through State 513 to attempt to re-read the affected cluster, etc., as indicated by State 512. It will be understood by one of ordinary skill in the art that a re-read of the cluster can include commands to flush a memory cache in the drive and/or seek to other portions of the drive.

State 513 limits the number of times that the drive manager 400 attempts to re-read the affected cluster, thereby preventing an infinite loop. When a predetermined number of iterations through States 508, 510, 512 and 513 occurs, the process proceeds from State 513 to State 515. In State 515, the drive manager signals an error, which can provide an indication to the host computer of a failed read.

Otherwise, the process advances to State 514. In State 514, the drive manager 400 updates the contents of the buffer that correspond to the new sector data indicated by the host computer. In another embodiment, the drive manager 400 updates the corresponding sector in the hard drive directly. Of course, in an embodiment where an error detecting code such as a checksum or CRC is not calculated, the sectors in the cluster that are not updated do not need to be read. The process advances from State 514 to State 516.

In State 516, the drive manager 400 recalculates the CRC for the data sectors of the cluster so that the CRC corresponds with the new data in the data sectors of the cluster.

The process advances from State 516 to State 518. In State 518, the drive manager 400 copies the cluster to the appropriate location in the drive. The entire process 500 or portions thereof can be repeated where multiple sectors are written by the host computer.

Figure 6:
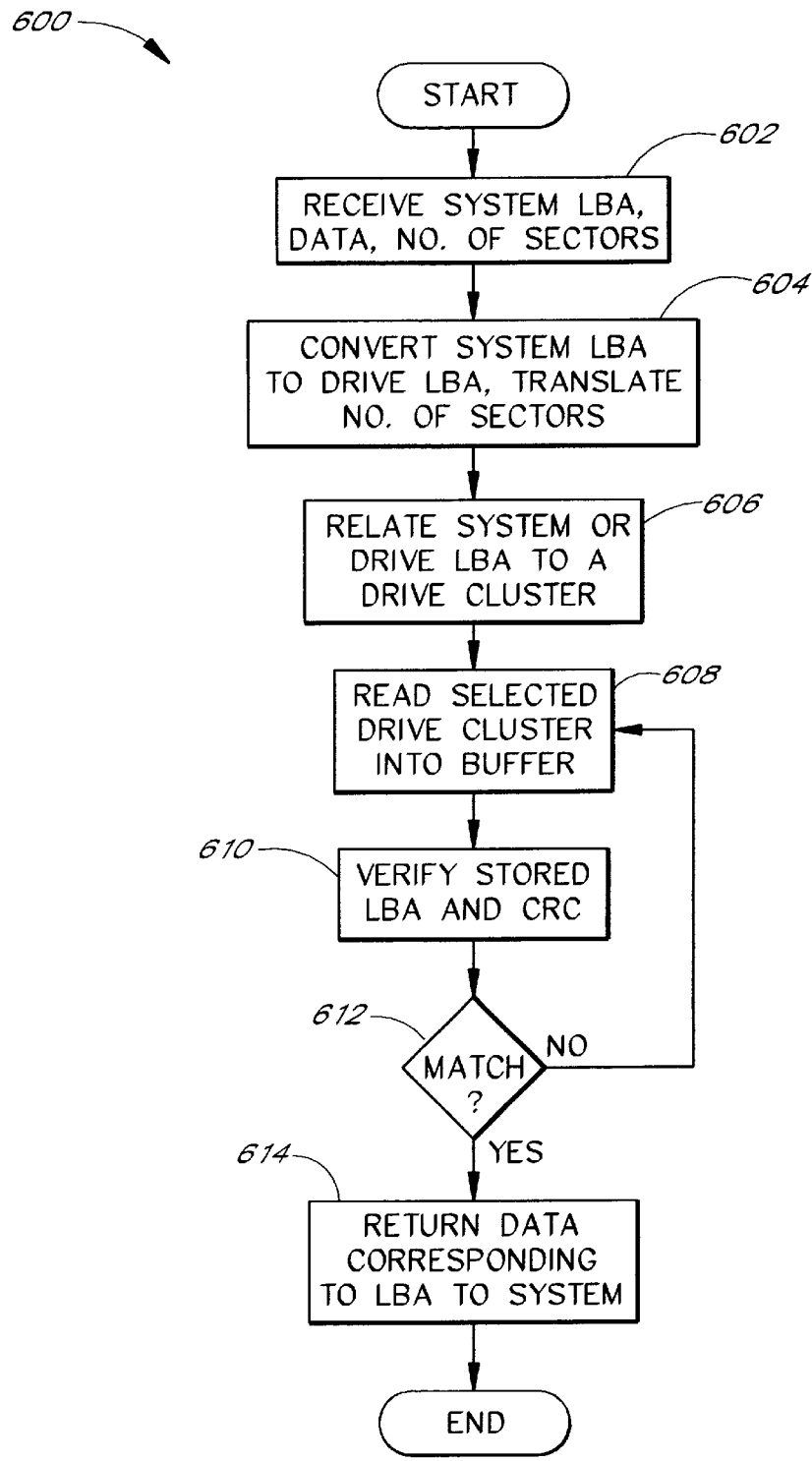
FIG. 6 is a flowchart of a process, according to an embodiment of the present invention, of reading from a hard drive.

FIG. 6 is a flowchart of a corresponding process 600, according to an embodiment of the present invention, of reading from the hard drive. States 602 to 612 of FIG. 6 are similar to States 502 to 512 of FIG. 5. In State 602, the host computer sends a request to read data from a sector in the hard drive. During a read request, the addition of the drive manager 400 disposed between the host computer and the drive is transparent to the host computer. Typically, the host computer requests data from a sector identified by the host computer's LBA, and requests the number of sectors for which the hard drive should supply data.

The process advances from State 602 to State 604. In State 604, the drive manager 400 translates the host computer system's LBA to the drive LBA as described in connection with State 504 of FIG. 5. Similarly, the drive manager 400 translates the host computer system's requested number of sectors to the drive's number of sectors. The process advances from State 604 to State 606.

In State 606, the drive relates a sector that is requested by the host computer to a cluster of sectors. In one example where one sector is requested by the host computer and a cluster includes 33 sectors, 32 of which are data sectors and one of which is an "extra" sector, the cluster of sectors corresponds to all 33 sectors in the same cluster as the requested sector. The process advances from State 606 to State 608.

In State 608, the drive reads the contents of the cluster associated with the requested sector. Preferably, the contents of the cluster are read into a buffer. The process advances from State 608 to State 610. In State 610, the drive manager 400 verifies that the stored LBA retrieved from the extra sector of the cluster matches with the expected LBA. In one embodiment, the stored LBA is the LBA of the first sector in the cluster. The drive manager 400 can optionally verify the integrity of the retrieved data by calculating an error detection code such as a CRC of the data sectors of the cluster and comparing the calculated CRC with the CRC stored in the extra sector of the cluster. The process advances from State 610 to State 612. In State 612, the drive manager 400 can respond to an error in the LBA or CRC by, for example, attempting to re-read the cluster as described in connection with State 512. Where re-reading is selected, State 612 returns to State 608. As described in connection with FIG. 5, the number of times that the process returns to State 608 can be predetermined to avoid an infinite loop. In addition, a maximum limit on the number of re-read cycles can be programmed or selected to avoid an infinite loop.

The process advances from State 612 to State 614. In State 614, the drive manager 400 selects the content of the cluster corresponding to the desired sector and accordingly transfers the selected content of the cluster to the host computer. Of course, the entire process 600 or portions thereof can be repeated where multiple sectors are requested by the host computer.

Figure 7:
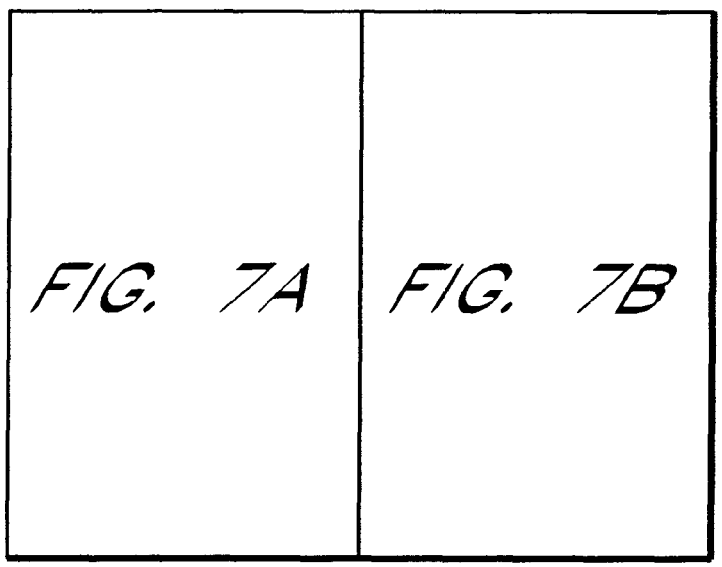
FIG. 7 consists of FIGS. 7A and 7B, and illustrates a block diagram of a circuit that generates extra sector information.
Figure 7A:
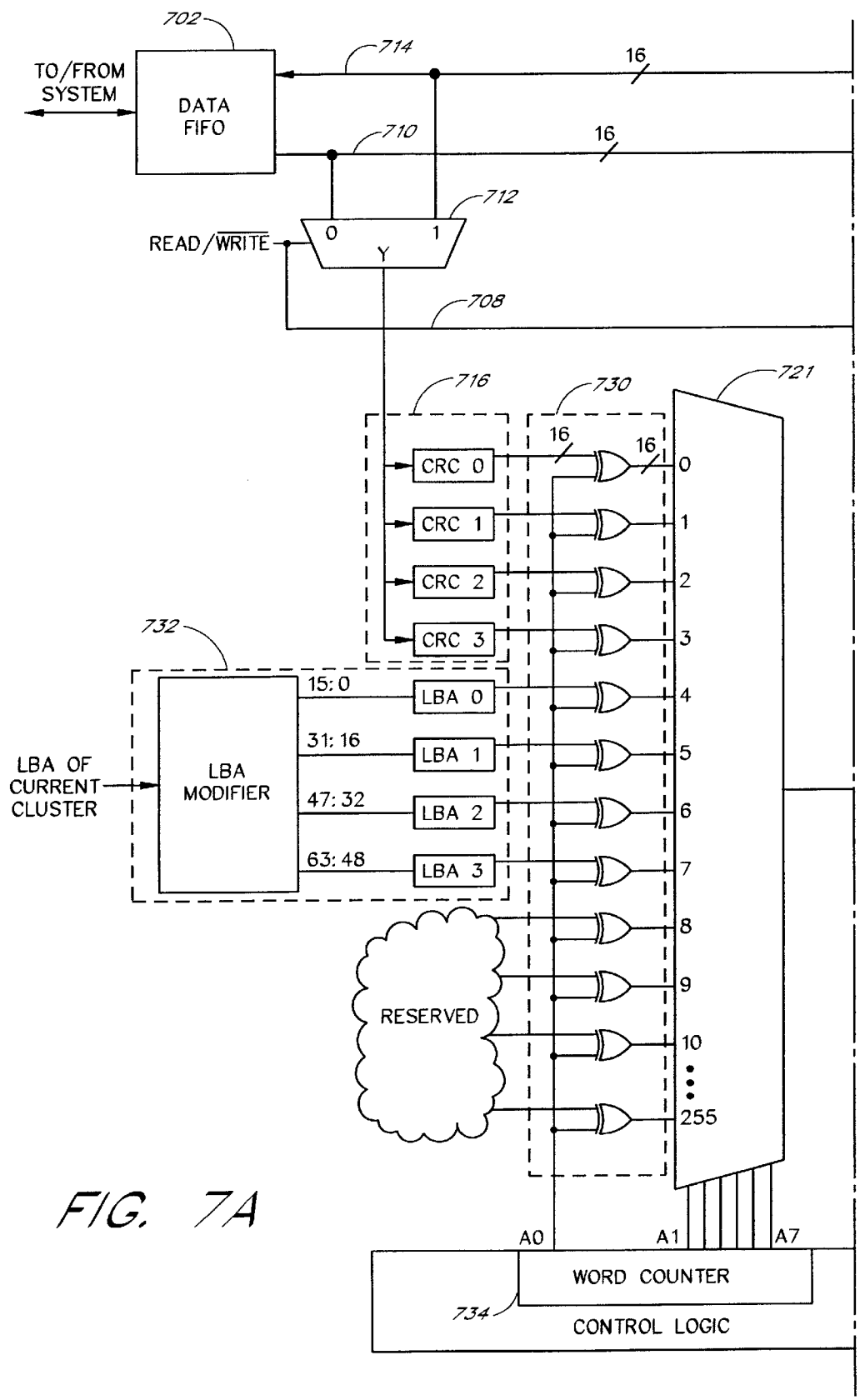
Figure 7B:
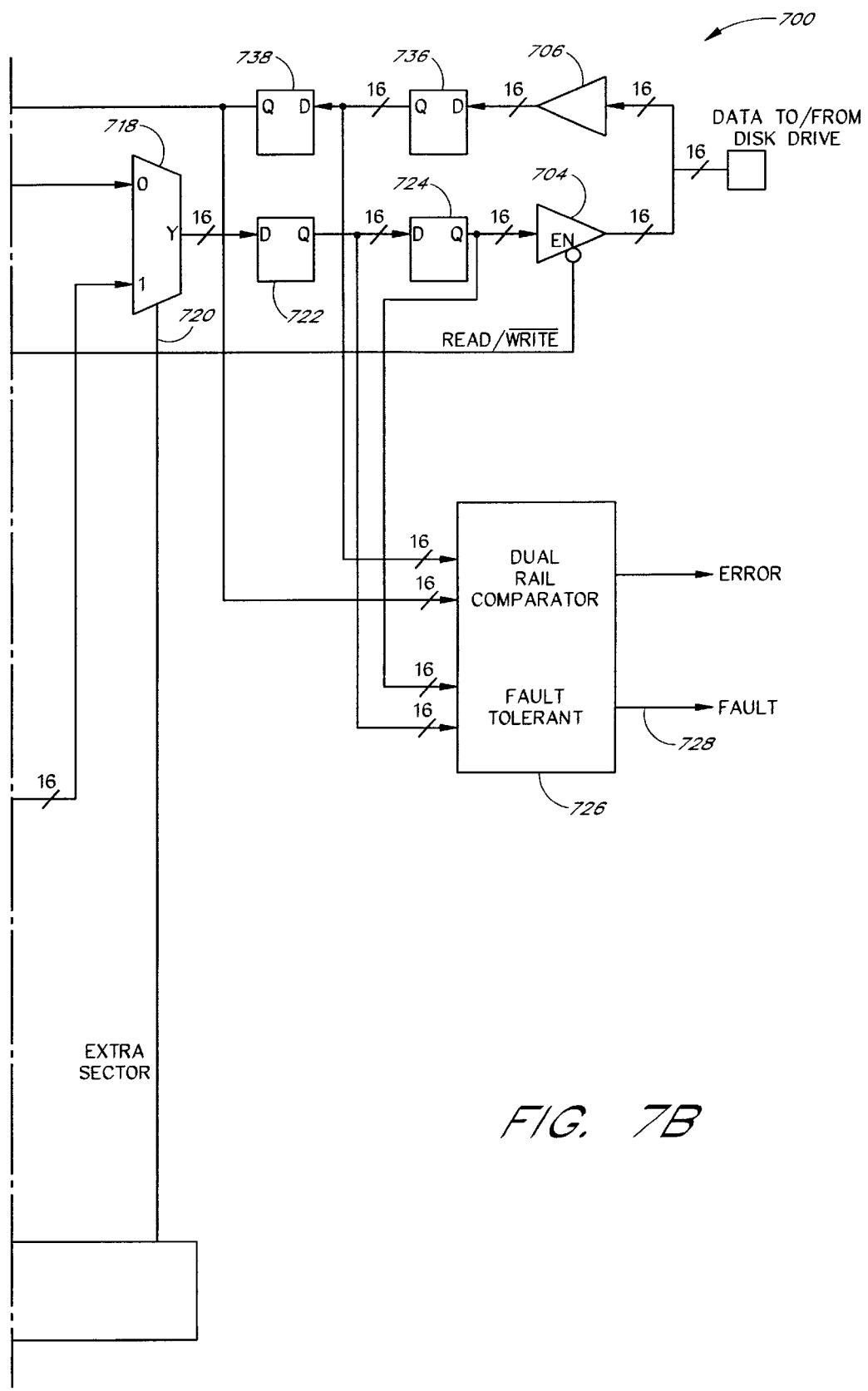

FIG. 7 illustrates a block diagram of one embodiment of a circuit 700 according to the present invention that generates extra sector information. The circuit 700 can be implemented in an application specific integrated circuit (ASIC), in a programmable gate array such as a field programmable gate array (FPGA), in a programmable logic device (PLD), or within another type of integrated circuit device. The functions of the circuit 700 could alternatively be implemented within the firmware of a microcontroller.

The host computer system communicates with a FIFO buffer 702. To the host computer system, the circuit 700 is transparent, i.e., looks substantially similar to a normal disk drive, albeit with reduced memory capacity. A disk drive communicates with the circuit 700 through tri-stateable buffers 704 and input buffers 706 or through transceivers. When the data is written from the FIFO buffer 702 to the disk drive, a read/write control signal 708 is activated as a "low" in the illustrated embodiment. The low state of the read/write control signal 708 enables the outputs of the tri-stateable buffers 704 and selects an output 710 of the FIFO buffer 702 through a first multiplexer 712. It will be understood by one of ordinary skill in the art that the output 710 and an input 714 of the FIFO buffer 702 can be multiplexed as I/O signals and the function of the first multiplexer 712 can be replaced by tri-stateable gates.

When data is written to the FIFO buffer 702, the read/write control signal 708 is activated as a "high" in the illustrated embodiment. The high state of the read/write control signal 708 disables the tri-stateable buffers 704 thereby avoiding bus contention and allowing the input buffers 706 to read data from the disk drive. The high state of the read/write control signal 708 further controls the first multiplexer 712 so that the first multiplexer selects the input 714 to the FIFO buffer 702. The first multiplexer 712 thereby allows one CRC generation circuit 716 to be used for calculation of both input and output data, i.e., allows reuse of the CRC generation circuit 716 for the initial computation and the verification computation. In one embodiment, the CRC generation circuit 716 computes the CRC polynomial known as the CRC-CCITT polynomial.

As explained in connection with FIG. 5, one embodiment of the present invention reads data from the cluster or clusters associated with an updated sector or sectors and substitutes the updated content in the FIFO buffer 702 before the data is written to the disk drive. When data is written to the disk drive, the data is output from the FIFO buffer 702 through the outputs 710 and is selected by a second multiplexer 718. The second multiplexer selects the output 710 when an extra sector control signal 720 is not activated. When the extra sector control signal 720 is activated, the second multiplexer selects as the input that is coupled to a third multiplexer 721. The third multiplexer 721 provides access to CRC and LBA verification data that is subsequently stored on the disk drive.

The data then passes through a first and a second write latch 722, 724, and then through the tri-stateable buffers 704 and onto the disk drive. It will be understood by one of ordinary skill in the art that the first and the second write latches 722 can be interspersed in the main data path as shown in the illustrated embodiment or can be fanned out on a separate path. In the illustrated embodiment, the first and second write latches 722 and 724 are configured to capture sequential words so that the sequential words can be compared in a dual-rail comparator 726.

The dual-rail comparator 726 advantageously allows the illustrated embodiment to detect a broad range of latent defects in the error detection/correction circuitry. Such latent defects, such as bits stuck at logic "1" or logic "0" can be difficult to detect. For example, where bits are stuck at logic "0," a checksum of the bits can consequently sum to zero and indicate a valid condition, when in fact a fault exists. By writing both the true and the complementary forms of error checking data, the dual-rail comparator 726 detects such latent defects, thereby permitting the circuit 700 to conform to a "self-checking checker."

In addition, the dual-rail comparator 726 can distinguish between errors where the disk drive is at fault and errors where the circuit 700 is at fault. Where the stored LBA is stored in both inverted and non-inverted forms, a further comparison between the two stored forms can reveal a defect in the error checking or error detecting circuitry. For example, where the comparison between inverted and non-inverted forms consistently detects an error in a bit, the circuit 700 can treat the failure as a failure in the error-checking circuitry itself and ignore the failure when accessing the disk drive.

The illustrated embodiment provides CRC and LBA verification data from the third multiplexer 721 in every other 16-bit word. A one's complement of each word of CRC and LBA data is stored in the 16-bit word locations that are skipped so that a simple compare operation, which can be implemented by Exclusive-OR (XOR) gates, can detect an error in the verification data. A fault signal 728 indicates an error in the verification data. In response to the fault signal 728, the system can log a failure, set an interrupt, re-read data, etc.

In one embodiment, a set of XOR gates 730 implements the one's complement by inverting the CRC data from the CRC generation circuit 716 and the LBA data from an LBA generation circuit 732 in response to the least significant bit (LSB) of an address of a word counter 734. The LBA generation circuit 732 converts the host computer's LBA to the disk drive's LBA as described in connection with FIG. 4.

The word counter 734 increments in response to each 16-bit word count, and in the illustrated embodiment, the LSB of the word counter 734 inverts every other word by asserting a logic "1" state as an input to the set of XOR gates 730. It will be understood by one of ordinary skill in the art that there are many ways to invert the CRC and LBA data, such as by coupling selectable inverters to the output of the third multiplexer 721. In one embodiment, the third multiplexer is implemented with multiple tri-stateable gates, which are enabled through decoding logic coupled to the word counter 734.

When the circuit 700 writes the extra sector containing the CRC and the LBA data to the disk drive, the second multiplexer 718 selects the output of the third multiplexer 721. In one embodiment where a sector contains 512 bytes, the extra sector also stores 512 bytes or 256 16-bit words. Table I, below, illustrates an exemplary memory map within the extra sector that can be used to address the third multiplexer 721.

TABLE I

| word address (b) | content |
| --- | --- |
| 0000 0000 | CRC[15:0] |
| 0000 0001 | CRC[15:0] inverted |
| 0000 0010 | CRC[31:16] |
| 0000 0011 | CRC[31:16] inverted |
| 0000 0100 | CRC[47:32] |
| 0000 0101 | CRC[47:32] inverted |
| 0000 0110 | CRC[63:48] |
| 0000 0111 | CRC[63:48] inverted |
| 0000 1000 | LBA[15:0] |
| 0000 1001 | LBA[15:0] inverted |
| 0000 1010 | LBA[31:16] |
| 0000 1011 | LBA[31:16] inverted |
| 0000 1100 | LBA[47:32] |

TABLE I-continued

| word address (b) | content |
| --- | --- |
| 0000 1101 | LBA[47:32] inverted |
| 0000 1110 | LBA[63:48] |
| 0000 1111 | LBA[63:48] inverted |
| 0001 0000 to 1111 1111 | reserved |

During a read from the disk drive, the data read from the disk drive is latched though a first and a second read latch 736, 738. In another embodiment, the first and the second read latches 736, 738 are fanned out on a separate path rather than interspersed between the disk drive and the FIFO buffer 702 as shown in the illustrated embodiment. The first and the second read latches 736, 738 allow comparison of data read from the disk drive. In one embodiment, alternate words in the extra sector are the one's complement of each other. A comparison of the alternate words is again performed by the dual-rail comparator 726, which can for example, indicate a fault, log errors, and initiate re-reads and the like in response to a failed match between a word and its complement.

Preferably, a CRC checksum of the data sectors is also stored in the extra sector. Those of ordinary skill in the art recognize the CRC as one of many techniques to validate data that is stored or transmitted. Many versions of the CRC exist, and these versions are commonly referenced by their divisor or "generator polynomial." In one embodiment, the CRC polynomial selected is known as the CRC-CCITT polynomial. Table II, below, lists several well-known CRC polynomials, though it will be understood that any appropriate polynomial or method can be used to verify the data.

TABLE II

| Name | Polynomial |
| --- | --- |
| CRC-16 | $X^{16} + X^{15} + X^{2} + 1$ |
| CRC-CCITT | $X^{16} + X^{12} + X^{5} + 1$ |
| CRC-32 | $X^{32} + X^{26} + X^{23} + X^{22} + X^{16} + X^{12} + X^{11} + X^{10} + X^{8} + X^{7} + X^{5} + X^{4} + X^{2} + X + 1$ |

It will be understood by one of ordinary skill in the art that an embodiment according to the present invention can be implemented in a variety of environments. One embodiment of the present invention can be implemented in a circuit board, such as a disk array controller board, that plugs into an ISA slot or a PCI slot of a standard computer. Another embodiment of the present invention is implemented within a motherboard of a host computer system.

FIG. 8 illustrates one embodiment of the present invention incorporated into a controller for disk array controller, such as one found in a redundant array of inexpensive disks (RAID). In a disk array system, multiple hard drives are used to provide size, speed, and reliability advantages over a single hard drive. For example, in some RAID systems, the contents of a failed hard drive can be recreated from parity bits. Because multiple hard drives are used in disk arrays, such as RAID systems, the cost of each hard drive impacts the overall cost of the disk array system multiple times. Embodiments of the present invention advantageously allow disk array systems to reliably use less expensive ATA hard drives as well as more costly SCSI hard drives.

FIG. 8 illustrates a disk array controller 800 interspersed between the host computer 304, which can be a server, and multiple hard drives 802, 804, 806. The disk array controller manages and distributes the storage of information across the multiple hard drives 802, 804, 806. The disk array controller 800 can be physically co-located with the host computer 304, or can be located separately. One embodiment of the present invention is advantageously incorporated into the disk array controller 800.

A typical disk array controller 800 already incorporates many components, which can be advantageously used to further incorporate an embodiment of the present invention at relatively little additional cost. For example, a typical disk array controller already contains memory buffers, microcontrollers, interfaces to drives, FPGAs, ASICs, PLDs and the like, some of which can be reconfigured to incorporate at least a portion of an embodiment of the present invention. In one embodiment, each automated controller controls a single, respective ATA drive, and includes the disk manager circuit shown in FIG. 7. The controller 800 can be implemented in hardware, such as in an ASIC. Alternatively, the controller 800 is implemented in software, such as within the firmware of a microcontroller.

The host computer 304 can communicate to the disk array controller 800 through a variety of interfaces, including ATA, SCSI, or a Fibre Channel, and the disk array controller 800 can similarly communicate to the hard drive in a variety of interfaces as appropriate for the particular hard drives used to implement the disk array. In one embodiment, the interface from the host computer to the disk array controller 800 differs from the interface used to access the hard drives. The disk array controller 800 may operate as generally described in U.S. Pat. No. 6,098,114, the disclosure of which is hereby incorporated by reference.

Figure 9:
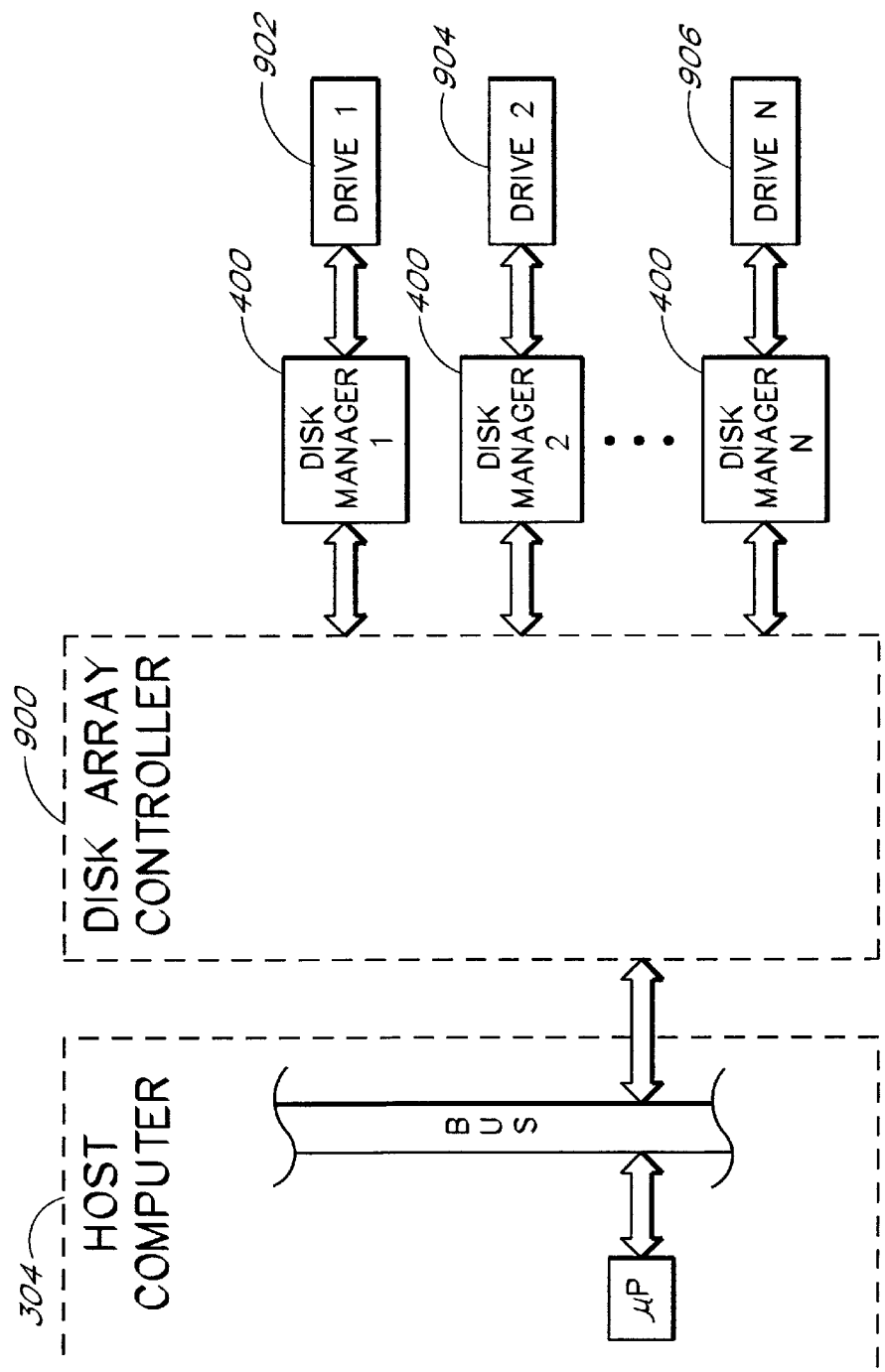
FIG. 9 illustrates an alternative embodiment of the present invention for a redundant array of inexpensive disks (RAID).

FIG. 9 illustrates an alternative embodiment of the present invention for a RAID. In the embodiment illustrated in FIG. 9, disk managers 400 are coupled between the disk array controller 900 and multiple hard drives 902, 904, and 906.

Various embodiments of the present invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A method of controlling a disk drive that uses standard-format, 512-byte sectors so as to determine whether data returned by the disk drive was read from a correct location, the method comprising:
   storing data on the disk drive within clusters of standard-format, 512 byte sectors such that a cluster includes multiple input/output (I/O) data sectors and an error detection sector, the error detection sectors containing an address value indicating logical block addresses to which the respective clusters correspond; and
   in response to a read request from a host, reading a cluster of data from the disk drive, and comparing the address value contained within the cluster of data to an expected address value to determine whether the disk drive accessed a correct cluster;
   wherein the method is performed by a controller that is external to the disk drive.

2. The method as defined in claim 1, wherein the error detection sectors further contain error detection codes for I/O data stored within the respective data sectors, and wherein reading a cluster further comprises determining whether the error detection code within the cluster data is consistent with the I/O data within the cluster data.

3. The method as defined in claim 2, wherein the error detection code is a CRC code generated from all I/O data stored within the corresponding cluster.

4. The method as defined in claim 1, wherein the disk drive is an ATA disk drive.

5. The method as defined in claim 1, wherein each cluster contains a number of I/O data sectors falling between 16 and 64.

6. The method as defined in claim 5, wherein each cluster consists of 32 I/O data sectors and one error detection sector.

7. The method as defined in claim 1, wherein each cluster contains exactly one error detection sector.

8. The method as defined in claim 1, wherein reading a cluster of data further comprises translating a logical block address received from the host to a target logical block address to account for a non-availability of the error detection sectors as I/O data sectors.

9. The method as defined in claim 1, wherein the method is implemented within automated circuitry of a controller device.

10. The method as defined in claim 1, further comprising:
    storing the address value stored in the error detection sector in both true and complementary form;
    reading both the true and the complementary form of the address value; and
    comparing the true and the complementary form of the stored address value so that where a discrepancy between the stored address value and the expected address value is detected, the method can distinguish between an error from the disk drive and an error from a circuit associated with computation of the error detection sector.

11. An error detection system that controls a disk drive that uses standard-format, 512-byte sectors to provide an indication as to whether the disk drive accessed a correct location, wherein the system is external to the disk drive such that the disk drive's hardware and firmware can remain unmodified, the system comprising:
    a store circuit adapted to store data on the disk drive within clusters of standard-format, 512-byte sectors, where a cluster includes multiple input/output (I/O) data sectors and an error detection sector, where the error detection sectors contain an address value that is related to a logical block address that corresponds to a sector from the cluster; and
    a read circuit adapted to read a cluster of data from the disk drive in response to a read request from a host, and to compare the address value contained within the cluster of data to an expected address value to determine whether the disk drive accessed a correct cluster.

12. The system as defined in claim 11, wherein the store circuit is further adapted to store error detection codes for I/O data stored within the respective data sectors of the error detection sectors, and wherein the read circuit is further adapted to determine whether the error detection code stored within the cluster data is consistent with the I/O data within the cluster data.

13. The system as defined in claim 12, wherein the error detection code is a CRC code generated from all I/O data stored within the corresponding cluster.

14. The system as defined in claim 11, wherein the disk drive is an ATA disk drive.

15. The system as defined in claim 11, wherein each cluster contains a number of I/O data sectors falling between 16 and 64.

16. The system as defined in claim 15, wherein each cluster consists of 32 I/O data sectors and one error detection sector.

17. The system as defined in claim 11, wherein each cluster contains exactly one error detection sector.

18. The system as defined in claim 11, wherein the read circuit is further adapted to translate a logical block address received from the host to a target logical block address to account for a non-availability of the error detection sectors as I/O data sectors.

19. The system as defined in claim 11, wherein the system is implemented in an application specific integrated circuit (ASIC).

20. The system as defined in claim 11, wherein the store circuit is further adapted to store the address value in both a true and a complementary form, where the read circuit is further adapted to read both the true and the complementary form of the address value and to compare the true and the complementary form to detect an error in the error detection system.

21. A method of organizing a plurality of sectors of a disk drive into a plurality of clusters, the method comprising:
arranging a cluster from the plurality of clusters of the disk drive into a plurality of data sectors and at least one extra sector;
maintaining input/output data in the data sectors; and
maintaining verification data for the cluster in the at least one extra sector.

22. The method as defined in claim 21, wherein the verification data comprises a value related to a logical block address of a sector in the corresponding cluster.

23. The method as defined in claim 21, wherein the verification data comprises a value related to the corresponding cluster.

24. The method as defined in claim 21, wherein the verification data comprises a value related to an error detection code of the corresponding data group of sectors.

25. The method as defined in claim 21, wherein the verification data comprises a value related to a Cyclic Redundancy Check (CRC) checksum of the corresponding data group of sectors.

26. The method as defined in claim 21, wherein the plurality of data sectors comprise a value that is a power of 2.

27. The method as defined in claim 21, further comprising:
maintaining both a true and a complementary form of at least a portion of the verification data stored in the extra sector; and
identifying a source of error based on a comparison between the true and the complementary form of the at least portion of the verification data.

28. A method of storing data in a disk drive such that an error can be detected when the stored data is later requested, the method comprising:
receiving a first address and a first data from a computer system, where the first data is associated with the first address, where the first data is to be maintained in the disk drive and the first address is an address associated with the computer system;
translating the first address to a second address to account for a non-availability of an error detection sector as a data sector, where the second address relates to a location of a sector in the disk drive;
relating the sector to a cluster of sectors, where the cluster of sectors contains data sectors and at least one error checking sector; and
storing an identifier in the error checking sector so that the cluster can be identifiably maintained from other clusters.

29. The method as defined in claim 28, wherein the disk drive comprises a plurality of disk drives in a disk array, and where each cluster with data sectors and at least one error checking sector is arranged within a single disk drive of the disk array.

30. The method as defined in claim 28, wherein the identifier comprises a logical block address of at least one sector in the cluster, and where the logical block address is the logical block address referenced by the disk drive.

31. The method as defined in claim 28, wherein the identifier comprises a logical block address of at least one sector in the cluster, and where the logical block address is the logical block address referenced by the computer system.

32. The method as defined in claim 28, wherein the identifier comprises a value related to a logical block address of a sector in the cluster.

33. The method as defined in claim 28, wherein the identifier comprises a plurality of logical block address for sectors in the cluster.

34. The method as defined in claim 28, wherein the identifier comprises a value related to a count of clusters.

35. The method as defined in claim 28, further comprising translating a capacity reported by the disk drive to an effective capacity, wherein the translating includes a compensation for a loss in capacity to account for a non-availability of the error detection sectors as data sectors.

36. A method of detecting an error in a disk drive, the method comprising:
receiving input/output data to be written to the disk drive;
writing the input/output data and additional verification data to the disk drive, where the input/output data and the additional verification data are stored in a cluster of the disk drive, where a sector containing the additional verification data is separate from sectors that store the input/output data in the cluster;
erroneously reading the input/output data and the additional verification data from the disk drive; and
comparing the additional verification data to an expected verification data to detect the error.

37. The method as defined in claim 1, wherein the method is performed such that the disk drive's hardware and firmware can remain unmodified.

38. The method as defined in claim 1, wherein the sectors of the cluster belong to a single disk drive.

39. The method as defined in claim 11, wherein the data sectors and the error detection sector of the cluster belong to a single disk drive.

40. The method as defined in claim 21, wherein the plurality of data sectors and the at least one extra sector for a cluster of the disk drive are arranged in a contiguous block of Logical Block Addresses (LBAs).

41. The method as defined in claim 36, wherein the sectors of a cluster are within a single disk drive.

42. The method as defined in claim 36, wherein each cluster comprises 32 data sectors for storing input/output data and one sector for additional verification data.

* * * * *